United States Patent [19]

Lowes

[11] 4,078,178

[45] Mar. 7, 1978

[54] DYNAMIC BACKGROUND SUBTRACTION CIRCUIT

[75] Inventor: Albert Robert Lowes, Hoffman Estates, Ill.

[73] Assignee: Kevex Corporation, Foster City, Calif.

[21] Appl. No.: 756,372

[22] Filed: Jan. 3, 1977

[51] Int. Cl.² .............................................. G01T 1/00
[52] U.S. Cl. ..................................... 250/336; 250/252
[58] Field of Search ............... 250/252, 272, 277, 336, 250/358, 306, 311

[56] References Cited

U.S. PATENT DOCUMENTS 3,581,087   5/1971   Brinkerhoff et al. ............ 250/277 X
3,612,876   10/1971   Grant .............................. 250/252 X Primary Examiner—Davis L. Willis

[57] ABSTRACT

A dynamic background subtraction circuit is disclosed which improves the display resolution of radiation energy spectra, such as X-ray energy spectra in an X-ray energy spectrometer. In this circuit, the number of radiation events (counts) occurring at a reference or background energy level is subtracted from the number of radiation events (counts) occurring at a second energy level under study. The output of this circuit is a real-time (dynamic) approximation of the count rate at the energy level under study, but with resolution improved by subtraction of the background counts.

6 Claims, 4 Drawing Figures

DYNAMIC BACKGROUND SUBTRACTION CIRCUIT

BACKGROUND

The invention relates to instrumentation systems which employ scanning of a specimen, for example: scanning electron microscopes, thyroid scanning systems, fuel rod scanning systems, electron microprobe systems, and related scanning systems. In this particular embodiment, the invention relates to a scanning electron microscope system which is used in conjunction with an X-ray energy spectrometer (FIG. 1).

In X-ray energy spectrometers, a cathode ray tube is mormally used to display a continuous spectrum of X-ray energy. As illustrated in FIG. 2, the horizontal ($x$) axis of this display represents X-ray energy (calibrated in kilo-electron volts, keV) and the vertical ($y$) axis represents the number of detected X-ray events (calibrated in X-ray counts). The spectral peaks in this display represent the gaussiam distribution for characteristic X-ray energy events (lines) of the element or elements present in the specimen being analyzed. Large peaks in the display indicated that there is a relatively large concentration of a particular element in the sample, while small peaks indicate that only traces of an element are present.

A common problem encountered when working with small concentrations of an element is that the ratio of peak counts to background continuum (noise) counts is small. This condition appears as a decrease in the signal-to-noise ratio (i.e., a loss of image contrast and sharpness), when employing a scanning electron microscope (SEM) to generate an x-ray map of the trace elements in a specimen (see FIG. 2). One solution to this problem has been to subtract the majority of background counts from the peak counts and thereby improve the resolution of the SEM x-ray image.

Substraction of background counts has previously been achieved by using a single channel analyzer (SCA) and a digital "count rate discriminator" circuit. The SCA was used to monitor X-ray events occurring in the energy band encompassing the elemental peak of interest, such as band $b_1$ to $b_2$ in FIG. 2. The output of the peak SCA was applied to a pulse rate discriminator circuit consisting of a one-shot and a comparator gate or flip-flop. The one-shot pulse width was selected by the operator to simulate a "mean background" count rate. When the element peak of interest was scanned by the SEM, the peak count rate would exceed the mean background rate and the comparator would enable output pulses from the discriminator circuit. The count rate discriminator therefore worked by inhibiting output pulses to the SEM video monitor whenever the observed x-ray count rate within the energy window of interest dropped below an operator-selected level, and enabling output pulses to the SEM monitor whenever the observed count rate exceeded that level.

Such a background subtraction scheme embodies a number of undesirable features, such as relying on a mean or average background approximation and depending on the observed background count rate to remain constant as the specimen is scanned. Considerable operator judgement may be required to optimize system performance under changing operating conditions. In addition, the efficiency of the image enhancement provided by this method decreases under conditions of low overall count rates and/or poor peak-to-background ratios and is also unsuitable for use at video scan rates. Finally, the output pulse rate from count rate discriminators is non-linearly related to the net peak count rate.

SUMMARY OF INVENTION

The present invention overcomes the shortcomings of previous background subtraction circuits in that pulses resulting from background radiation are digitally stored and ultimately subtracted from pulses resulting from radiation detected in the energy band under study. Thus, as illustrated in FIG. 3, only counts representing average count rate difference between the two inputs appear at the output. The circuit eliminates the inaccuracy and other shortcomings of the previously mentioned background subtraction scheme while automatically providing a continuous real-time output signal. The output pulse train represents the pulse (count) rate difference between either random or periodic input pulses, and the output pulse rate difference is essentially unaffected by the input pulse rate or input pulse ratio variations.

DESCRIPTION OF THE PREFERRED EMBODIMENT

Figure 1:
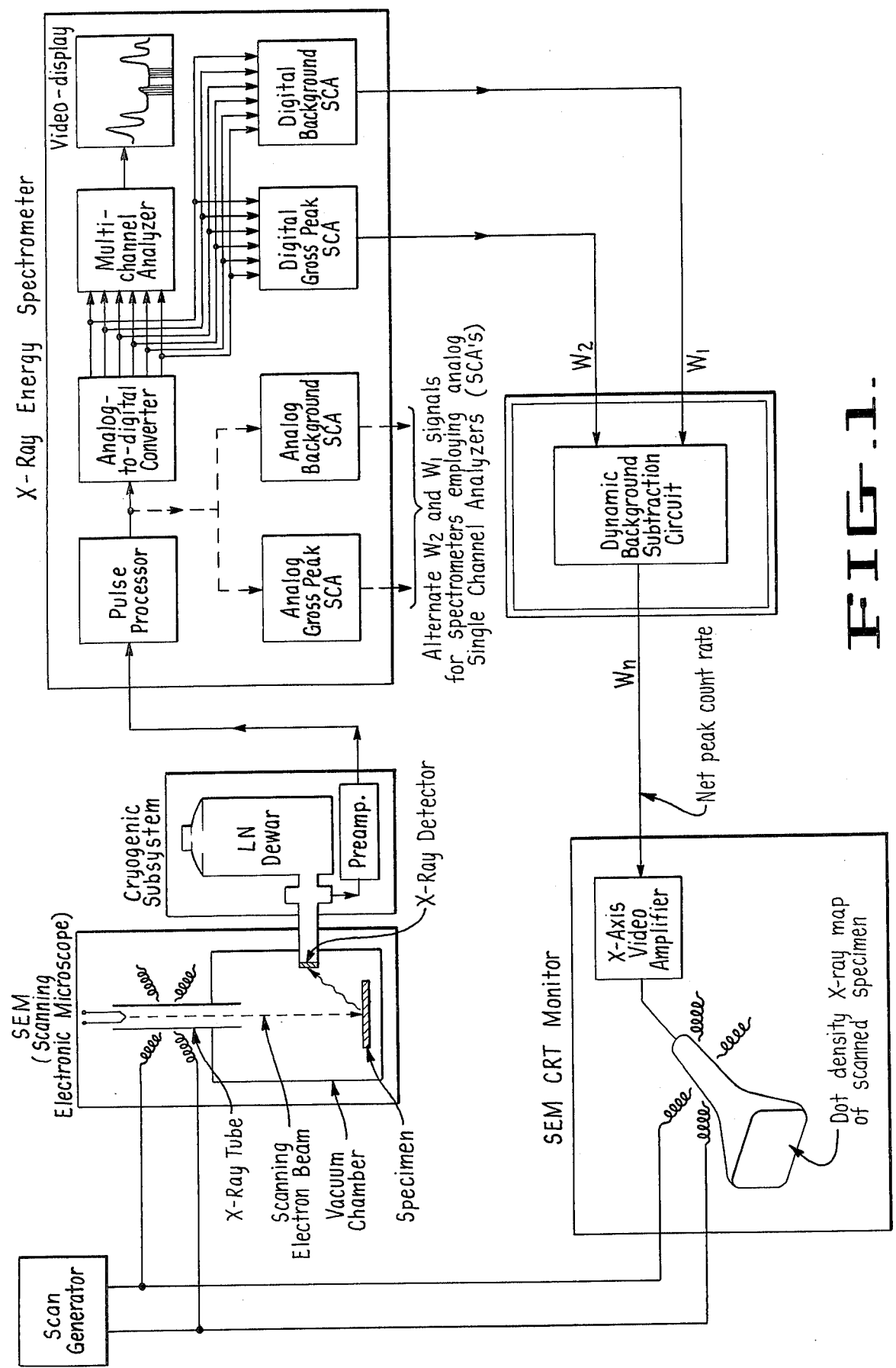
FIG. 1 represents a typical application of the invention and illustrates some typical input and output signals for the invention.
Figure 3:
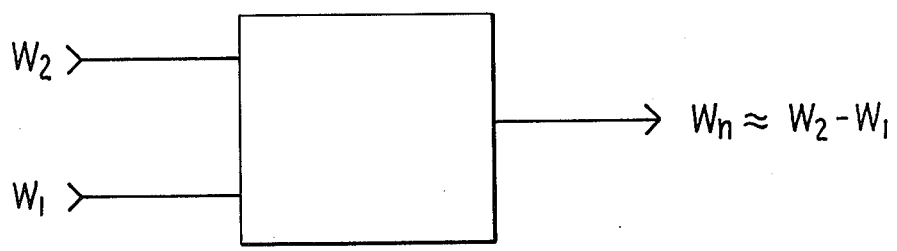
FIG. 3 is a box diagram of the circuit of this invention.
Figure 4:
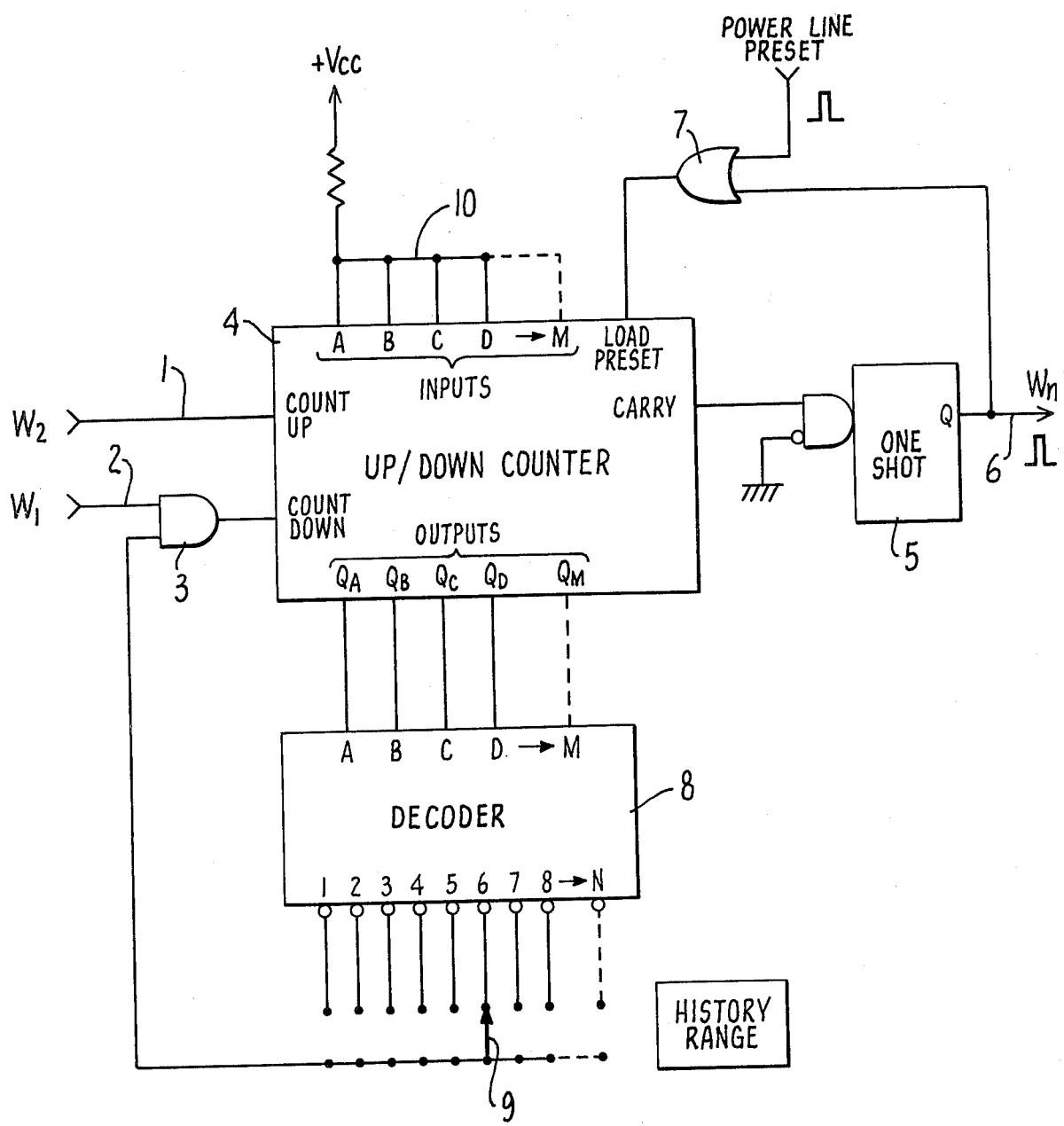
FIG. 4 is a block diagram of the dynamic background subtraction circuit showing the up-down counter, the preset circuitry, and the count range selector circuitry.

This invention is applicable to any system wherein radiation pulses are detected and counted. However, the preferred embodiment as illustrated in FIG. 3 and FIG. 4 is used in x-ray spectrometer systems wherein x-ray events are detected and displayed. In such systems, x-rays are first detected and then converted into analog or digital form by an x-ray energy spectrometer as shown in FIG. 1. The dynamic background subtraction circuit of FIG. 4 subtracts the background counts from counts in the energy band of interest and supplies an output pulse train (whose count rate approximates the difference between the two count rates), to the SEM CRT display and thereby provides an enhanced (background-removed) x-ray image.

Figure 2:
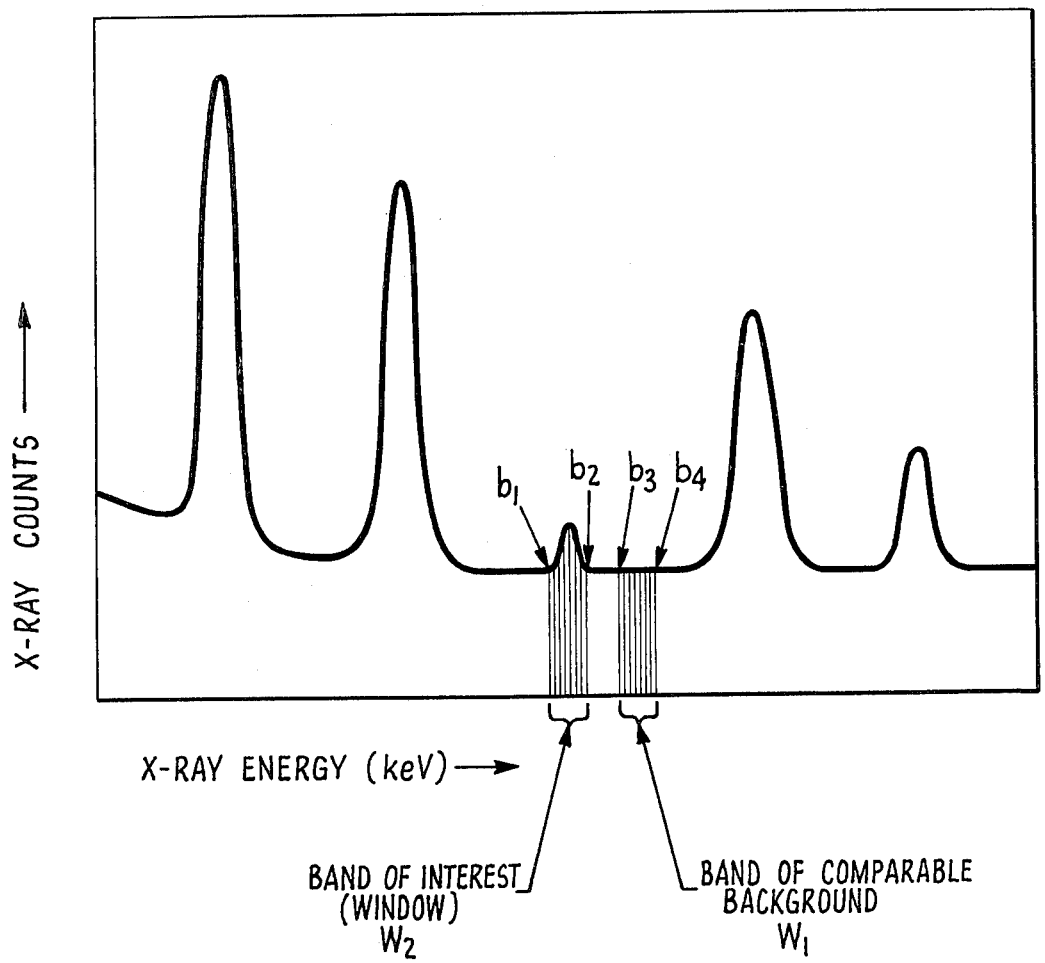
FIG. 2 represents a typical display of an X-ray energy spectrum as it may appear on the CRT output of an X-ray energy spectrometer. The horizontal ($x$) axis represents different levels of X-ray energy and is calibrated in kilo-electron volts. The vertical ($y$) axis displays the number of X-ray events occuring at a particular energy level and is calibrated in "counts".

As shown in FIG. 2, the number of pulses, $W_2$, developed by detection of radiation for the peaks in the energy band of interest $b_1$–$b_2$, are greater than the number of pulses, $W_1$, developed by detection of the adjacent background or noise energy band $b_3$ and $b_4$. $W_1$ and $W_2$ may be a series of pulses which are either random or periodic and need not be time related since the electron beam and CRT scan rates are considerably slower than the processing rate for X-ray pulses.

Referring to FIG. 4 by reference characters, logic OR gate 7, during the initial power-up sequence, momemtarily passes a power line preset pulse to the "LOAD/PRESET" input of an Up/Down Counter 4. The counter outputs are loaded to the maximum count state (all ones) by a "logic one" voltage maintained on the "Data Input" lines 10. As x-ray events are detected by monitoring the "peak" energy band of interest, the series of pulses, $W_2$, is developed. If such a pulse ($W_2$) is applied through line 1 to the "COUNT UP" input of Up/Down Counter 4, it will immediately generate a "CARRY" output transition since the counter has already been set to its full count capacity. This transition is applied to a monostable multivibrator 5 which generates a short duration pulse, $W_n$, providing an output pulse at line 6 suitable for use with the external SEM display equipment. This same output pulse is also applied through OR gate 7 to the "LOAD/PRESET" input of Up/Down Counter 4 which forces the counter to immediately reload to its maximum count and prevents the "reset to zero" condition which otherwise would occur upon receipt of the $W_2$ pulse. In this mode of operation, either random or periodic pulses applied at the $W_2$ input line 1 will appear immediately (neglecting propagation delay) at the $W_n$ output 6 in the form of short duration pulses.

If a pulse, $W_1$, representing an output pulse from the band of "background" energy, is applied through line 2 to AND gate 3 and thence to the "COUNT DOWN" input of the Up/Down Counter 4, the counter will count down (subtract) one count from its preloaded maximum count, and consequently will not generate a "CARRY" output transition. If additional pulses are applied to the $W_1$ input, the counter will continue to count down (subtract counts) from its preloaded full-count capacity.

In actual operation, the peak count rate ($W_2$) applied to the "COUNT UP" input of the counter always exceeds that of the background input ($W_1$), thus forcing the counter to eventually count up until it again reaches its full count capacity. In this state, every additional $W_2$ (peak) pulse at line 1 will cause "CARRY" output transitions to occur and will generate net count ($W_n$) output pulses. The circuit, therefore, functions in such a manner as to subtract background counts $W_1$ from peak counts $W_2$. Under dynamic conditions the $W_n$ output count rate approximates the difference between the desired peak background and background count rates and provides a net peak count rate as the output signal. The inherent advantage of this circuit over conventional pulse rate comparison circuits is that it can store many events prior to receiving further $W_2$ (peak) pulses, thus storing a history of events, each of which is ultimately subtracted from succeeding $W_2$ pulses (cancelling an equal number of $W_2$ pulses) before further $W_n$ (difference) output pulses are generated.

The Up/Down Counter capacity may be increased to cover any suitable count range by cascading counter stages to include "M" outputs. The counter output lines may be connected to input lines of a cascadable M-to-N line Decoder, generally designated 8. The operator selects a decoded output count using a "HISTORY RANGE SELECTOR" switch, generally designated 9. This switch inhibits AND gate 3 so that $W_1$ (background) pulses cannot subtract additional counts from the Up/Down Counter. This feature allows a "count down limit" to be placed on the counter to minimize a time lag phenomena that could develop from storing so much $W_1$ history that the $W_2$ data throughput rate is adversely affected. This setting is dependent on the total count (pulse) rate for a particular experiment, and may be optimized for each particular situation by the operator performing the analysis.

One advantage of using the circuit described above to process randomly occurring events encountered with X-rays and other radiation is that the $W_n$ net output pulses (counts) bear a true real-time relationship to the input events in that initiation of the output pulses is synchronized (neglecting propagations delays) with the occurrence of input events. Therefore, the $W_n$ pulses occur simultaneously with events occurring in the spectrum of interest. A second advantage is that the $W_n$ net output pulses may be made to agree with the definition $W_n = W_2 - W_1$ over a large dynamic range of count rate ratios, i.e. $W_2 : W_1 = 1 : 1$ through $2^m : 1$. Other advantages will be apparent to those skilled in this art within the scope of the invention defined in the following claims.

I claim:

1. In a system for detecting and displaying radiation energy spectra, a method for improving display resolution by elimination of background noise comprising the steps of
   a. detecting and processing to a first series of pulses the radiation events occurring in a selected energy band of interest;
   b. detecting and processing to a second series of pulses the radiation events occurring in at least one selected background energy band whose background counts are comparable to the background counts in the said band of interest.
   c. counting the pulses of said first series;
   d. simultaneously subtracting from that count the pulses of said second series to produce an output pulse train that is the difference in the number of pulses between both series of pulses;
   e. and utilizing said output pulse train to drive a display.

2. In this system of claim 1, the further step comprising placing a predetermined limit on the subtraction of background pulses such that, when the limit is reached, no further subtraction operations will occur.

3. In a system for detecting and displaying radiation energy spectra having means for detecting and processing to a first series of pulses the radiation events occurring in a selected energy band of interest and means for detecting and processing to a second series of pulses the radiation events occurring in at least one selected background energy band whose background counts are comparable to counts in the said band of interest, a dynamic background subtraction circuit for improving the display image by elimination of background noise comprising:
   a. an up/down counter;
   b. means applying the first series of pulses to one input of the up/down counter, such that each pulse results in a "count up" operation;
   c. means applying the second series of pulses to a second input of said up/down counter, such that each pulse results in "count down" operation;
   d. means presetting said up/down counter in a fully-loaded (highest count) state such that if said "count-up" operation occurs before said "count-down" operation, said up/down counter will generate a "carry" pulse at the counter output; and
   e. presetting means whereby each "carry pulse" at the counter output presets or "loads" the up/down counter to its fully-loaded state.

4. In the system of claim 3, the dynamic background subtraction circuit further compromising
   a. means detecting said "carry" pulse and, when said "carry" pulse is present, providing an appropriate duration digital pulse output.

5. In the system of claim 4, the dynamic background subtraction circuit further comprising
   a. means routing said digital output pulse into two parallel paths,
   b. the first of said paths passing said digital output pulse to an external video display counter, etc., which monitors and/or displays the net count rate output,
   c. the second of said paths passing said digital pulse to the "preset" terminal of said "up/down counter" setting said counter to its fully loaded state.

6. In the system of claim 3, the dynamic background subtraction circuit further including
   a. means preventing additional "count down" operations from occurring whenever the numerical output of said up-down counter reaches a predetermined value.

* * * * *